（12）United States Patent
Foxen

(10) Patent No.: US 9,377,240 B2
(45) Date of Patent: Jun. 28, 2016

(54) SYSTEM AND METHOD FOR RECOVERING TURPENTINE DURING WOOD MATERIAL PROCESSING

(71) Applicant: Robert J Foxen, Long Island, NY (US)

(72) Inventor: Robert J Foxen, Long Island, NY (US)

( * ) Notice: Subject to any disclaimer, the term of this patent is extended or adjusted under 35 U.S.C. 154(b) by 135 days.

(21) Appl. No.: 14/462,024

(22) Filed: Aug. 18, 2014

(65) Prior Publication Data

US 2015/0040422 A1 Feb. 12, 2015

Related U.S. Application Data

(63) Continuation of application No. 13/151,231, filed on Jun. 1, 2011, now Pat. No. 8,832,964.

(60) Provisional application No. 61/350,649, filed on Jun. 2, 2010.

(51) Int. Cl.
*F26B 19/00* (2006.01)
*F26B 21/14* (2006.01)
*C09F 3/00* (2006.01)
*C10G 33/00* (2006.01)
*C10G 5/06* (2006.01)
*F26B 3/00* (2006.01)

(52) U.S. Cl.
CPC . *F26B 21/14* (2013.01); *C09F 3/00* (2013.01); *C10G 5/06* (2013.01); *C10G 33/00* (2013.01); *F26B 3/00* (2013.01); *C10G 2300/1014* (2013.01); *Y02E 50/14* (2013.01); *Y02P 30/20* (2015.11)

(58) Field of Classification Search
CPC ............ F26B 11/00; F26B 19/00; C09F 3/00; Y02E 50/00; Y02E 50/14; D21C 11/00; D21C 11/0007

USPC ................ 34/331, 396, 80, 90, 201; 530/202; 144/329, 364, 380; 201/3, 21, 30; 203/83, 85; 162/14, 15, 62, 68; 430/109.4, 150, 160; 159/47.1, 17.2
See application file for complete search history.

(56) References Cited

U.S. PATENT DOCUMENTS

| | | | | |
|---|---|---|---|---|
| 3,432,402 A | * | 3/1969 | Kirkland | D21C 11/0007 159/47.1 |
| 3,492,198 A | | 1/1970 | Rosenblad | |
| 3,745,063 A | | 7/1973 | Fisher | |
| 3,763,020 A | * | 10/1973 | Drew | A23L 2/64 159/17.2 |
| 3,871,951 A | | 3/1975 | Drew | |
| 4,925,527 A | | 5/1990 | Ryham | |
| 5,752,328 A | * | 5/1998 | Yamamoto | F26B 3/00 34/217 |
| 8,832,964 B2 | * | 9/2014 | Foxen | C09F 3/00 144/364 |

(Continued)

FOREIGN PATENT DOCUMENTS

| | | | | |
|---|---|---|---|---|
| CA | 2293918 A1 | * | 6/2001 | ............ F26B 11/028 |
| SE | WO 2007115771 A1 | * | 10/2007 | ................ F26B 3/08 |

*Primary Examiner* — Stephen M Gravini
(74) *Attorney, Agent, or Firm* — Smith Tempel; Gregory Scott Smith

(57) ABSTRACT

A system, method and configuration for recovering turpentine during the manufacturing of wood chips, wood pellets or other substances that may include turpentine. In general, a turpentine recovery system is used to capture turpentine from exhaust of a dryer as wood chips are being dried. Advantageously, application of the various techniques disclosed herein can result in the recovery of turpentine that can then be sold to generate revenue and, may contribute to a reduction in the capital and operation costs for emission controls for the dryer exhaust.

20 Claims, 7 Drawing Sheets

(56) References Cited

U.S. PATENT DOCUMENTS

| | | | |
|---|---|---|---|
| 9,140,495 B2* | 9/2015 | Ferrell | B30B 11/225 |
| 9,181,509 B2* | 11/2015 | Bland | C10L 5/366 |
| 9,239,187 B2* | 1/2016 | Pepitone | F26B 3/24 |
| 2011/0301326 A1 | 12/2011 | Foxen | |
| 2015/0040422 A1* | 2/2015 | Foxen | C09F 3/00 34/469 |

* cited by examiner

SYSTEM AND METHOD FOR RECOVERING TURPENTINE DURING WOOD MATERIAL PROCESSING

CROSS REFERENCE TO RELATED APPLICATIONS

This is a non-provisional application being filed in the United States Patent Office under 35 USC 111 and 37 CFR 1.53(b) as a continuation of the United States Patent Application that was filed on Jun. 1, 2011 and assigned Ser. No. 13/151,231, which application claims priority to the provisional application for patent that was filed in the United States Patent Office under the title of SYSTEM AND METHOD FOR PELLET MANUFACTURING on Jun. 2, 2010 and assigned Ser. No. 61/350,649. Each of these applications is hereby incorporated by reference in their entirety including the specification and all exhibits and attachments thereto.

BACKGROUND

Wood pellets are a type of wood fuel, generally made from wood residues or wood chips from roundwood. Wood residues are usually produced as a byproduct of sawmilling and other wood transformation activities. The pellets are extremely dense (approximately 42 pounds per cubic foot) and can be produced with a low moisture content (below 10%) that allows them to be burned with a very high combustion efficiency. Further, their regular geometry and small size allow for automatic feeding with very fine calibration. They can be fed to a burner by auger feeding or by pneumatic conveying.

Pellets are produced by compressing dried wood feedstock material which has first passed through a dryer and hammer mill to provide a uniform dough-like mass. This mass is fed to a press where it is squeezed through a die having holes of the size required (normally 6 mm diameter, sometimes 8 mm or larger). The high pressure of the press causes the temperature of the wood to increase greatly, and the lignin plastifies slightly forming a natural 'glue' that holds the pellet together as it cools.

Pellets conforming to normal practices in industry may have less than 10% water content, are uniform in density, have good structural strength, and low dust and ash content. Because the wood fibers are broken down by the hammer mill, there is virtually no difference in the finished pellets between different wood types. Pellets can be made from nearly any wood variety, provided the pellet press is equipped with good instrumentation, the differences in feed material can be compensated for in the press regulation. The energy content of wood pellets typically ranges from about 7,000 BTU/lb to 8,000 BTU/lb.

Pellets are used for industrial purposes to produce heat and/or electricity, by electric utilities, and by individuals in pellet stoves to produce heat for homes. Many large European utilities use wood pellets to generate electricity to comply with renewable energy requirements.

Emissions such as NOx, SOx and volatile organic compounds from pellet burning equipment, are, in general, very low in comparison to other forms of combustion heating, making this one of the less-polluting heating options available. One possible problem is emission of fine dust (particulate matter), especially in urban areas, when there is a high concentration of pellet heating systems, coal, or oil heating systems in close proximity. The PM2.5 emissions of older pellet stoves and boilers can be problematic in close quarters, especially in comparison to natural gas (or renewable biogas), though electrostatic precipitators and baghouse particle filters for pellet heaters have been developed and considerably reduce the problem when installed as standard. This potential problem can also be mitigated by producing pellets with low ash content, which should be less than 0.7% for residential pellets. This low ash content can be achieved by debarking the wood prior to pelletizing.

A fully automated stove or oven only requires the initial actions of loading the pellets into the stove and turning on the stove. The stove then automatically does the rest including: (a) automatically lighting, (b) automatically feeding the pellets into the flame with an auger, (c) automatically adjusting the rate to keep the room at a pre-set temperature with an electric thermostat, etc.

The combustion of sustainably managed and harvested wood or biomass is generally considered to represent one of the best practical, and readily available, means for sustainable use of low net-carbon combustion for economic sectors that require the use of combustion. The medium of wood or biomass pellets, as a form of energy transfer, provides a fungible, mass-producible, commerce-ready product capable of putting sustainable biomass combustion technology to work for the modern-day consumer. Furthermore, in many cases, wood/biomass pellets are less expensive and nearly as convenient as other fuel sources.

High-efficiency wood pellet stoves and boilers have been developed in recent years, offering combustion efficiencies of over 90%. Wood pellet boilers—having limited control over the rate and presence of combustion compared to liquid or gaseous-fired systems—are particularly well suited for hydronic systems due to the hydronic system's greater ability to store heat. In particular, pellet burners capable of being retrofitted to oil-burning boilers are predicted to be available on the market within the next several years.

One of the problems curbing the growth of pellet fuel use in the United States is that a common, industry wide standard has not been developed or accepted. Various users employ the use of different standards or requirements throughout the United States and there is no regulatory authority enforcing the use of any particular standard. In addition, many of the standards or requirements deployed in industry have been developed by the Pellet Fuel Institute, and are generally less strict than those of Europe. For example, United States consumers accept and use pellets that are manufactured such that exposure of the pellets to large volumes of water in may result in significant degrades in the material (i.e., the pellets turn into "mush"). Even in view of a lack of an emerging standard within the United States, many manufacturers attempt to developed pellets that comply with "some" standard in an effort to product a quality product. This effort by manufactures is largely fueled by that fact that the warranties offered for United States manufactured or imported combustion equipment typically do cover damage caused by pellets that do not conform with regulations.

The prices for pellets manufactured in the United States surged during the fossil fuel price inflation that occurred in the years of 2007 to 2008. Subsequent to this time, the prices of pellets in the United States have decreased significantly beginning late in the year of 2008 and early 2009. Generally, the price for pellets in the United States is lower on a per-BTU basis than that of most fossil fuels, excluding coal. However, the use of coal is not a highly favored heating option for many residential and commercial consumers due to several reasons. A few of these reasons include the frequent maintenance/tending requirements of the equipment by end users, the high carbon emissions, air pollution (often leading to nuisance complaints from neighbors and/or investigation by boards of health and environmental agencies), the mess generated by coal dust and/or improper storage, as well as potentially dangerous fly ash.

The high density of pellets also permits for compact storage and rational transport over long distances. Furthermore, the pellets can be conveniently blown from a tanker to a storage bunker or silo on a customer's premises. As the price of heating with fossil fuels increases, the market potential for pellet heating solutions expands A large number of models of pellet stoves, central heating furnaces and other heating appliances have been developed and marketed since about 1999. With the surge in the price of fossil fuels beginning in the year 2005, the demand for such equipment has increased all over Europe and a sizable industry is emerging.

Turpentine is a wood extractive found in most coniferous woods. During the pulping process, wood chips are heated and lignin is dissolved which drives turpentine into the liquid/vapor space within a digester. In the batch cooking process, the vapor space of the digester is vented or relieved. Typically in industry, the turpentine is recovered by condensing the vapors generated in the digester.

BRIEF SUMMARY

The present disclosure presents embodiments of a system, method and configuration for recovering turpentine during the manufacturing of wood chips, wood pellets or other substances that may include turpentine. In general, a turpentine recovery system is used to capture turpentine from exhaust of a dryer as wood chips are being dried. Advantageously, application of the various techniques disclosed herein can result in the recovery of turpentine that can then be sold to generate revenue and, may contribute to a reduction in the capital and operation costs for emission controls for the dryer exhaust.

More specifically, one embodiment includes a system that operates to extract turpentine during a pelletizing process. The system includes a dryer that is configured to receive wood chips and heat the wood pellets at a temperature that generates a gas that at least includes water and turpentine. As it is well known that turpentine may auto ignite at temperatures above 428 degrees Fahrenheit to 491 degrees Fahrenheit, certain embodiments ensure that the temperature remains below the auto ignite trigger for at least a portion of the heating time. As the dryer heats the wood content being processed, a gas is formulated. The system also includes an emission control system for receiving the gas from the dryer and removing any particulates. The emission control system used in the various embodiments may include one or more of the following elements as well as other techniques: a cyclone separator, wet electrostatic precipitator, filter, etc. The filtered gas is then fed to a condenser that condenses at least a portion of the gas into a condensate. The condensate is then delivered to a decanter which receives the condensate and separates the water from the turpentine.

In an exemplary embodiment, the decanter may include a first outlet for removing turpentine from the decanter and a second outlet for removing water and other materials. For instance, because water is denser than turpentine, the turpentine may migrate to the top of the decanter and be easily removed from a first outlet existing near the top of the decanter. Similarly, as the more dense water and other particulates sink in the decanter, a second opening located near the bottom can be used for extracting the water and particulates and forwarding them to a waste treatment center or system.

In some embodiments, a gas cooler may be used, either in addition to, in lieu of, or partially in addition to the condenser. For example, in one embodiment the gas cooler receives gas from the condenser that was not converted into condensate, and cools the gas to condense it prior to delivering the condensed gas to the decanter and venting out unwanted gasses to a filter or emissions system (such as a VOC capture system).

In various embodiments, the parameters of the dryer may vary and may even be alterable. For instance, a lager dryer may be used to allow the time that the wood under process for drying to be increased. In other embodiments, the time that the wood under process is exposed to the heat can be regulated by how fast the wood is passed through the dryer. In other embodiments, the temperature may be adjusted. In some embodiments, the dryer includes at least two stages. A first stage of the dryer heats the wood chips to a temperature for extracting the turpentine. The second stage heats the wood chips to a temperature for extracting water and other materials from the wood chips. In some embodiments, the temperature and the exposure time can be adjusted either automatically based on detected extraction of turpentine, or under user control. For instance, if the system detects that the level of the turpentine collection has dropped a certain percentage, the system may determine that further processing of the current material will not yield enough turpentine to warrant continued extraction. In such cases, the current material can be dumped and processing can continue with a new load. In addition, the percentage of turpentine extracted can be monitored and if a certain percentage is not be achieved over a given period of time, the process may also be terminated. In yet another embodiment, if the level of turpentine extraction falls below a desired threshold, the temperature of the dryer may be increased incrementally and monitored to see if additional turpentine is being extracted. After a given period of time, the system may conclude that the bulk of the turpentine has been extracted and them automatically move into the second stage and raise the temperature. Thus, the temperature, the exposure time and the operation of the system and stages can be controlled automatically based on a fixed schedule, based on feedback from the system and the process or under user control.

As a non-limiting example, in one embodiment, the temperature in the first stage may range from around 300-400 degrees Fahrenheit or other sub-ranges therein as well as some tolerances outside the explicit ranges. Further, in an exemplary embodiment the temperature in the second stage may range from 600 to 800 degrees Fahrenheit or other sub-ranges therein as well as some tolerances outside the explicit ranges. The first stage of drying could involve use of a steam dryer or hot air dryer. In addition, in the multi-stage embodiments, the temperature in the first one or more stages may be set to less than the auto-ignite temperature of turpentine. As a more specific non-limiting example, the temperature in the first stage can be set to less than 428 degrees Fahrenheit.

In other embodiments, a single dryer may be operated in at least two phases. For instance, during the first phase, the temperature of the dryer can be kept below the auto-ignite temperature of turpentine. During a second phase, the temperature of the dryer can be increased to above the auto-ignite temperature of turpentine.

The present disclosure also presents a method for recovering turpentine from a wood processing system. The method can be implemented in any type of wood processing system that either includes a dryer or to which a dryer can be added. Initially, the wood that is being processed is fed into the dryer. The temperature of the dryer is then increased to a temperature that is sufficient to evaporate the turpentine that is present in the wood being processed, thereby creating a gas. The gas containing at least the evaporated turpentine is then directed from the dryer into a condenser to create a condensate. The condensed gas is then fluidly directed into a decanter. The decanter is structured to separate the turpentine from other materials in the condensate. Finally, the turpentine is then sent to a storage tank or holding tank.

In some embodiments, the action of heating the dryer to a temperature sufficient to evaporate the turpentine may include initially heating the dryer to a temperature that is sufficient to evaporate turpentine but prevent an auto-ignite of the turpentine. In yet other embodiments, the action of heating the dryer to a temperature sufficient to evaporate the turpentine may include initially heating the dryer to a temperature that is sufficient to evaporate turpentine but prevent an auto-ignite of the turpentine for a first period of time, and then heating the dryer to a temperature in the range of 600 to 800 degrees Fahrenheit for a second period of time. In yet another embodiment, the action of heating the dryer may include heating the dryer to a temperature of about 428 degrees Fahrenheit or less to evaporate the turpentine, and then heating the dryer to a temperature in the range of 600 to 800 degrees Fahrenheit for a second period of time.

The various method embodiments may further include the action of filtering the gas to remove particulates prior to directing the gas into the condenser.

Other embodiments described herein may include a method for modifying a wood processing system to aid in the recovery of turpentine. This method may include the actions of adding a dryer to the existing system or controlling the temperature of an existing dryer used to dry the wood being processed. In either case, the temperature is controlled such that it can be raised to a level sufficient to evaporate the turpentine present in the wood being processed to create a gas. The gas is then directed into a condenser to create a condensate. The condensate is then fluidly directed into a decanter. The decanter then separates the turpentine from other materials in the condensate.

These and other embodiments of the turpentine recovery system and method will be more fully understood by examining the figures and the detailed description.

DETAILED DESCRIPTION OF EMBODIMENTS

The present disclosure is focused on new and novel systems and methods for recovering of turpentine during the manufacturing of wood chips and wood pellets. In an exemplary embodiment, a volatile organic compounds recovery system is used to capture turpentine from the dryer exhaust as wood chips are being dried. Advantageously, application of the various techniques disclosed herein can result in the recovery of turpentine that can then be sold to generate revenue and, may contribute to a reduction in the capital and operation costs for emission controls for the dryer exhaust.

Turpentine can be removed from wood or recovered during processing of the wood in various stages. One such stage is available as wood is being harvested and then prepared for shipment, such as in making wood pulp, wood chips etc. For mill processing, the window of opportunity to extract or recover turpentine from wood opens at the time the tree is cut and terminates when the rail car or tank truck is closed for shipment. In exemplary systems, wood chips are fed to a digester and a cooking liquor and black liquor can be added in sufficient quantity to cover the chips. Various methods are used to assure uniform dense packing of the wood chips in the digester. After the chips and liquors are added, the digester is closed, and the digester cooking process is started. This can be accomplished by steaming the digester directly or indirectly. Direct steaming can be done by injecting steam directly into the digester; indirect steaming can be done by circulating liquor through external steam heat exchangers.

As such, in the mill environment, three periods can be examined in a digester cook or cycle as they relate to turpentine recovery. The first is the exhausting of the digester where a large percentage of "air" is removed. Second is the heating up to cooking pressure and temperature, and the third period is the cooking period. The cooking period is determined by the mill's pulp needs.

Figure 1:
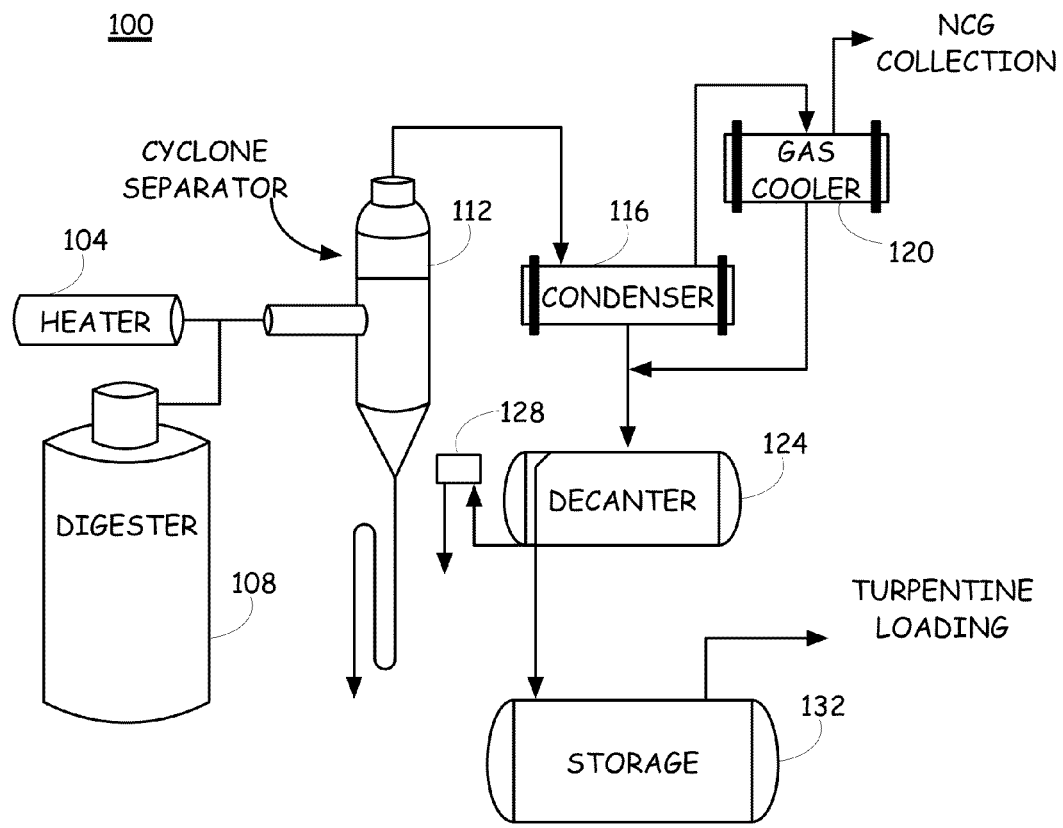
FIG. 1 is a block diagram of an exemplary system that can be used to recover turpentine generated from a digester during the process of making pulp from wood chips.

FIG. 1 is a block diagram of an exemplary system that can be used to recover turpentine generated from a digester during the process of making pulp from wood chips. The illustrated system 100 includes a heater 104 and a digester 108. The gasses generated by the digester 108 include quantities of turpentine, steam, and non-condensable elements. These gasses are vented directly into a separator 112 where any liquor or fiber carry-over can be removed. After cleaning the gasses, the gas vapors are transferred to one or more condensers 116, and the resulting condensate (turpentine and water) is then fed into the decanter 124. The non-condensable gases from the condenser are sent to a gas-cooler 120 and then to a collection system for proper disposal.

The decanter 124 operates to separate the turpentine from the water, with the turpentine overflow being fed into a storage tank 132 and the water underflow going to process treatment or sewage 128.

In operation, the digester cooks small wood chips for several hours to soften the wood chips. Before the wood is run through the digester, it must undergo certain preparations. First, the harvested trees are cut into logs. Generally, these logs are anywhere from four to eight feet in length. The logs are then sent to a debarking drum, which is very large and in the horizontal position. This debarking drum rotates and strips all of the bark away from the logs. The bare logs are then fed to a chipper. Here, the logs are reduced to handheld sized chip pieces. While being processed in the digester, gasses are generated and vented from the digester.

Extracting the turpentine from the digester can be a complicated process. The profile of the digester must be programmed to maintain pulp quality, be compatible with the mill's standard pulping practices, minimize consumption of the mill's prime steam usage and optimize turpentine recovery. The digester vent relief is one of the most important factors in the efficient recovery of turpentine.

During the process of making wood chips, a different turpentine (or C10H16) recovery program is implemented in exemplary embodiments. For instance, during the process of drying of wood chips made from harvested southern yellow pine (SYP) and other species of pine trees used to create wood pellets, other densified wood products, or any other materials that contain recoverable turpentine, turpentine is released and can be recovered. It should be appreciated by those having ordinary skill in the art that although the various embodiments described herein are directed towards recovery of turpentine during the drying process of making wood pellets, various other processes that involve the drying of wood as part of the production process could employ aspects of the disclosed recovery technique to recover turpentine. In addition, the disclosed recovery techniques may also be used to make dried or partially dried wood chips that could be used by residential users, industries or electric generating facilities that use wood fuel alone or where wood is co-fired with coal or other fossil fuels.

Figure 2:
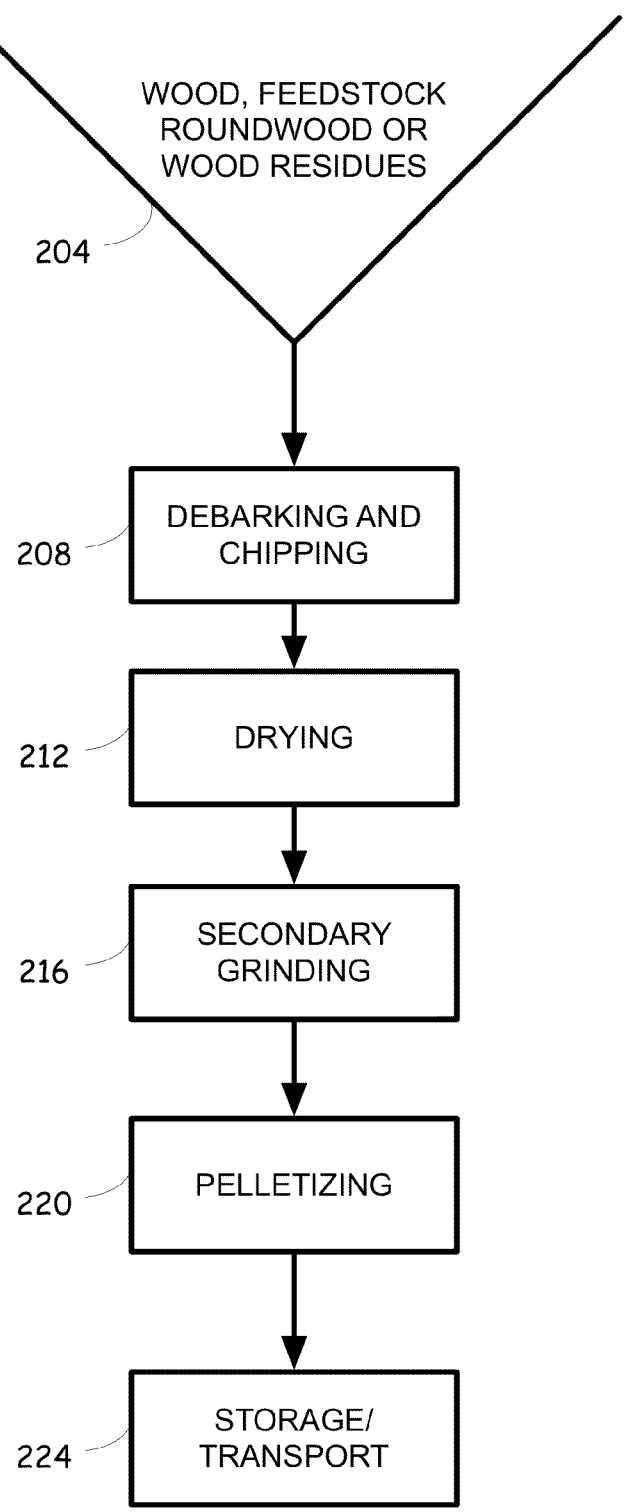
FIG. 2 is a flow diagram depicting an exemplary flow diagram actions performed in an exemplary process for making wood pellets.

FIG. 2 is a flow diagram depicting exemplary flow diagram actions performed in an exemplary process for making wood pellets. As illustrated, the pellet facility receives roundwood or wood residues (typically chips, sawdust or wood shavings from sawmills or other sources) 204. However, it will be appreciated that a wide variety of materials may be fed into this system and the described input is provided as a non-limiting example. Roundwood and residues are chipped to approximately ½ to ¼ inch in size and then conveyed into a dryer to reduce the moisture content (MC). The MC of roundwood and wood residues is typically about 45% to 55%. In some cases, a hog (a secondary chipper) may be used to reduce oversized chips prior to the drying process.

In exemplary embodiments, the thermal energy used for driving or energizing the dryers can be provided from bark removed from the roundwood, dried chips, and/or from fossil fuels. Thus, the pelletizing process may include the debarking and chipping of the roundwood to generate fuel for the dryer 208. The bark, dried chips or fossil fuel is combusted in a burner that is used to provide energy for the process of drying the wood chips 212. In the drying process 212, the thermal energy operates to volatize the volatile organic compounds (VOCs) and moisture contained within the wood chips and residues. In the standard pellet plant design, the VOCs and moisture are emitted directly into the atmosphere, or sent to an emission control system, which typically consists of a wet electrostatic precipitator (ESP) and a Regenerative Thermal Oxidizer (RTO). The employment of the dryer reduces the MC of the roundwood or other wood residue from the typical 45% to 55% down to approximately 8% to 12%.

After drying, the dried wood chips are sent to a secondary grinder that reduces the size of the wood chips to approximately ⅛ inch 216. The wood chips are then conveyed into pelletizers, which compress the chips into pellets having a density of approximately 40 to 45 pounds per cubic foot (#/cf) 220. Alternatively, the ground and dried chips could be compressed to make briquettes, logs or other densified wood products.

The pellets are then cooled and sent to a storage bin prior to shipping them to a customer or putting them into distribution channels 224.

To produce dried or partially dried chips rather than pellets, all of the above steps in the process could be performed with the exception of the action of pelletizing the wood product 220.

The various embodiments described herein for recovering turpentine during the drying process provide advantages over the prior art systems. For instance, in an embodiment that utilizes a VOC recovery system to capture turpentine from the dryer exhaust and recover the turpentine from the dryer exhaust, at least the following benefits are realized:

1. Turpentine can be efficiently recovered and sold to produce revenue for the project or plant. It is estimated that SYP contains about 0.5 to 1.0 gallons of turpentine per oven dry ton of SYP.

2. The plant can avoid or reduce the capital and operating costs for emission controls for the dryer exhaust.

Exemplary embodiments of the turpentine recovery technique are unique in the industry because the turpentine is being captured from gasses emitted during the drying process. The recovery process disclosed in various embodiments and equivalents thereof is accomplished by installing a recovery system on the dryer exhaust. The recovery system typically includes a condenser. Conventional pellet facilities either emit the turpentine and other VOC's into the atmosphere, or combust them in a regenerative thermal oxidizer (RTO) without capturing any value. If an RTO is used, facilities must also typically install a wet electrostatic precipitator (ESP) to remove particulates prior to the RTO. Moreover, the RTO requires addition of fossil fuel (usually natural gas or propane) to combust the turpentine and other VOC's, thereby further increasing the operating cost of the plant. Finally, embodiments of the recovery system operate to alleviate the need for separate emission controls to meet air permit requirements because most of the VOC emissions are captured by the condenser. Various embodiments may also include a cyclone or wet ESP prior to the condenser to reduce particulate emissions.

Exemplary Embodiments of a Dryer

Most wood dryers employed within conventional pelletizing plants operate at air inlet temperatures of approximately 600 F to 850 F. These temperatures are selected to minimize the VOC emissions and thus, avoid the need for separate emission control systems. However, in recovering turpentine from a dryer, it may be necessary to reduce the dryer temperature because the auto-ignition temperature for turpentine ranges from 428 degrees F. to 491 degrees F. However, it should be appreciated that while lowering the temperature within the dryer may prevent auto-ignition of the turpentine, it also results in the requirement of an increased dryer residence time and hence, potentially an overall increase in the size and cost of the dryer. It should be appreciated that the optimum dryer temperature, size and drying time can vary from embodiment to embodiment and although particular ratios may be considered as novel, not all embodiments must employ the exact same parameters. For instance, the temperature, size and time can be determined for some embodiments through prototyping, design studies, etc. In addition, the parameters may be selected based on other criteria. For instance, if the plant is limited in space such that the dyer must be forced to be a certain size, the temperature and time parameters can be adjusted to obtain the optimal setting for maximizing recovery. Similarly, if the plant has to process a minimum amount of pellets in a given time, thus creating a ceiling on the time parameter, the temperature and dryer size parameters can be adjusted accordingly. Depending on results of design requirements and studies, some embodiments may utilize a two-stage drying system, in which the turpentine is removed in the first stage and the remaining excess moisture is removed in the second stage. In addition, in some embodiments of the dryer recovery systems, it may be desirable to recycle some or all of the dryer exhaust to concentrate the turpentine and facilitate its recovery.

Turpentine Recovery

Figure 3:
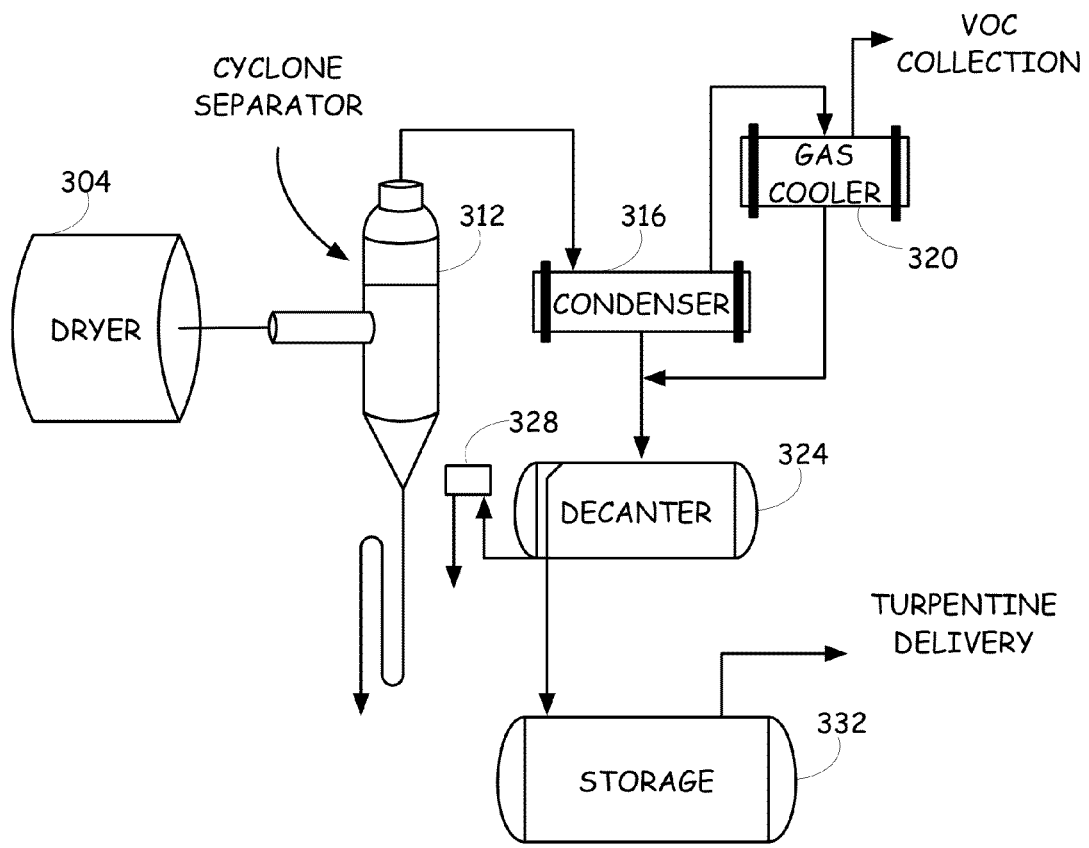
FIG. 3 is a block diagram illustrating exemplary components and/or functions of a dryer based turpentine recovery system.

FIG. 3 is a block diagram illustrating exemplary components and/or functions of a dryer based turpentine recovery system. As shown, the dryer 304 applies thermal energy to heat up woodchips and create gasses. The gasses, among other things, include water and turpentine that has been evaporated during the drying process.

In the various embodiments, the dryer may be an integral component of the wood processing system or, the dryer may be added into the system for extracting turpentine. In the various embodiments, the temperature of the dryer and/or the amount of time that the wood material is within the dryer may be controlled by a controller. The controller may be programmed for certain temperatures and/or timing parameters, may be controlled by a user/operator and/or may be controlled based on feedback received during the drying and recovery process. As such, a processor with memory components and/or a user interface may be used for controlling the dryer. In some embodiments, an existing dryer component may be replaced by a custom configured dryer. In other embodiments, an existing dryer may be altered to provide the necessary control. In yet other embodiments, a dryer may be added to a system that may not include a dryer.

The gasses from the dryer are exhausted from the dryer and first, they pass through a cyclone separator 312. It should be appreciated that in some embodiments, rather than a cyclone separator 312, or in addition thereto, the system may employ a wet electrostatic precipitator and/or other similar system to remove particulates. Thus, a variety of techniques may be used to filter the gasses to remove the particulates. The gasses are then passed into a condenser 316. If particulate removal is not needed prior to the condenser, then the cyclone separator and/or wet electrostatic precipitator and/or other similar systems can be eliminated from or not included within the recovery system. The condensate produced by the condenser 316 is then fed to a decanter. The decanter 324 operates to separate the water and turpentine. Non-condensable gases from the condenser 324 may be sent to a gas cooler 320 prior to being sent to the decanter 324. Within the decanter 324, the turpentine is pulled from the top of the decanter 324 and stored in a storage tank 332. Water or other residue is drained from the bottom of the decanter 324 and is sent to the sanitary sewer or to an on-site treatment system 328. The turpentine stored in the tank 332 is then held until shipment to the consumer. Although the above-described embodiment used a condenser to recover turpentine and moisture emitted from the dryer, other embodiments may use other recovery processes such as activated carbon. Further, other embodiments may utilize a two stage, or multi-stage condenser to increase turpentine recovery. In such embodiments, the first stage may operate at a higher temperature of around 200 F to 220 F as a non-limiting example, to remove most of the water, and the second stage would operate at a lower temperature of approximately 110 F to 130 F as a non-limiting example, to remove turpentine. The two stage recovery approach may enable production of higher concentrations of turpentine, which could increase the amount of turpentine recovered.

The condensate is sent to the decanter 324 or other separation system to separate the water from the turpentine. Once the turpentine condensate has been cooled and condensed satisfactorily, the decanter operates to separate the turpentine. In exemplary systems, the turpentine can be separated by using gravity since the turpentine is lighter than water. As such, in gravity based embodiments, turpentine bearing condensates should not be pumped to the decanter as the pumps operate to emulsify the turpentine and make it much more difficult to separate in the decanter. Further, the vertical drops and the number of elbows in the system should be minimized to reduce the risk of mixing and turbulence and thus, making the separation process more difficult. The turpentine will typically separate at concentrations in excess of 500 ppm.

In an exemplary embodiment, the decanter can be fed at 110-130° F. when an NCG cooler/scrubber is not available for the decanter vent. If the decanter vents to an NCG cooler/scrubber the decanter may be operated at temperatures of 150-160° F. However, the gas cooler under flow should typically be returned to the decanter feed.

More specifically, the purpose of an exemplary decanter is to utilize gravity to separate the turpentine and the water. This is readily accomplished by using a tank designed for turpentine overflow and water under flow, while maintaining a turpentine water interface in the tank. In designing a decanter, a horizontal rather than a vertical tank is much preferred. This structure minimizes the distance of travel in the turpentine droplets through the water and water droplets through turpentine while maximizing the interface surface area. The increased surface to flow ratio minimizes the condensate superficial velocity. The superficial condensate flow is defined as the flow rate/decanter surface area. The superficial condensate velocity should be kept below 10 ft/hr and preferably below 5 ft/hr. Space limitations normally dictate the length to diameter ratio. Despite the preference for a horizontal tank, many mills today use vertical vessels. Several mills have no decanter and use their storage tank for separation.

The rule of thumb for decanter capacity is that it should be seven times in gallons the daily pulp production tonnage. For example, a 1,000 TPD pulp mill should have a 7,000 gallon decanter. With adequate entrainment separation, a nominal 2-3 hour hold up time in the decanter is adequate while maintaining the 5-10 ft/hr superficial condensate velocity.

In exemplary embodiments, the separation of the turpentine can be improved by giving consideration in reducing turbulence within the decanter. Smooth, laminar flow is ideal. To accomplish this, the condensate should be introduced just below the interface between the turpentine and water layer. A baffle may be used to reduce currents. Because the condenser is often located 6-12 m (20-40 feet) above the decanter, the condensate has a high velocity at the point of entry into the decanter. Falling through an empty line promotes turbulence and discourages separation of the turpentine and water. Some mills install a small tank in the line just before the decanter and vent the tank back into the condenser. This arrangement advantageously reduces the entrance velocity of the condensate and thereby reduces turbulence in the decanter. An equally effective solution is to install an orifice plate 15-20 ft. (5-7 m), ahead of the decanter. The orifice plate has the added advantage of providing a decanter flow measurement. The orifice may sometimes be useful in performing material balances and troubleshooting the system if setup to measure flow-rate.

The turpentine from the decanter would then be sent to a storage tank prior to shipment. Waste water from the decanter would be sent to a sanitary sewer or on-site treatment system.

Figure 4:
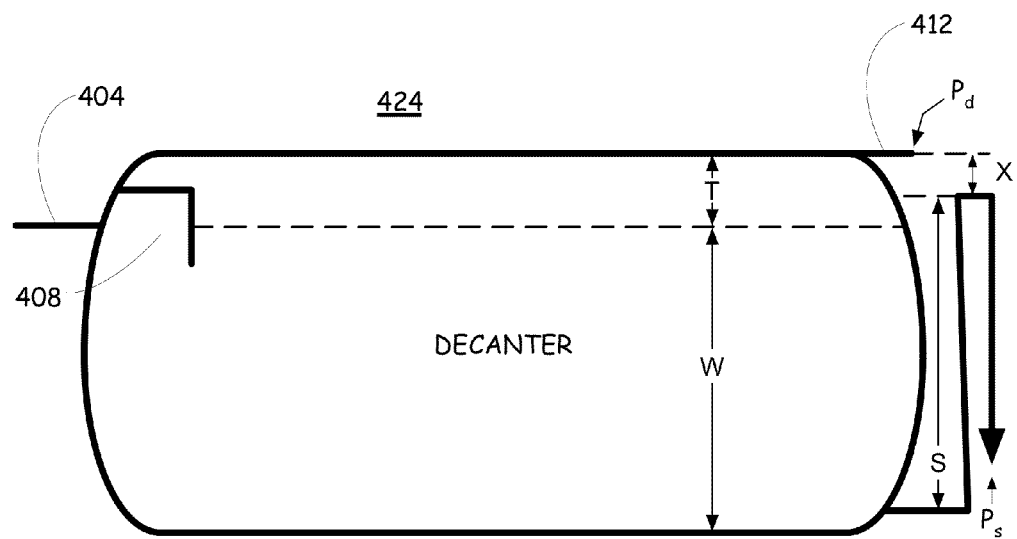
FIG. 4 is an exemplary design for a decanter that may be utilized in various embodiments of the turpentine recovery system.

FIG. 4 is an exemplary design for a decanter that may be utilized in various embodiments of the turpentine recovery system. Although an interface level controller will maintain the desired level in the tank, the simplest automatic separator works on a hydraulic balance principal as illustrated in FIG. 4. The height of the water under flow leg fixes the position of the interface as is shown in FIG. 4. The level of the under flow leg with respect to the elevation of the turpentine level may be calculated as follows:

$$T = X^* D_w / (D_w - D_t) + (P_d - P_s)/(D_w - D_t)$$

where:

T=the level of the turpentine
$D_t$=Density of the turpentine
$D_w$=Density of the water
$P_d$=Turpentine overflow back pressure
$P_s$=Underflow flow resistance
From FIG. 4, the geometric relationship is as follows:

$$T+W=S+X \quad (1)$$

The pressure balance is as follows:

$$T*D_t+W*D_w+P_d=S*D_w+P_s \quad (2)$$

where:
$T*D_t+W*D_w$ is the Turpentine Layer hydrostatic pressure
$P_d$ is the Overflow back pressure
$S*D_w$ is the Underflow leg hydrostatic pressure and
$P_s$ is the underflow leg hydrodynamic pressure
Multiplying equation 1 by Dw yields the following equation:

$$T*D_w+W*D_w=S*D_w+X*D_w \quad (3)$$

Subtracting equation 3 from equation 2 yields:

$$T*(D_t-D_w)+P_d=P_s-X*D_w \quad (4)$$

And solving the equation 4 for T yields:

$$T=(P_s-P_d-X*D_w)/(D_t-D_w)=(X*D_w+P_d-P_s)/(D_w-D_t) \quad (5)$$

By examining the non-limiting example for various values provided in the following scenario, it can be appreciated that the back-pressure and depth can have a very significant effect on the interface level in the turpentine decanter

EXAMPLE $D_w$=62.4 lb/ft$^3$=8.33 lbs/gallon
$D_t$=53.8 lb/ft$^3$=7.2 lbs/gallon
X=0.5 ft.
Pd=0.25 psi=36 lb/ft$^2$
Ps=0.01 psi=1.44 lb/ft$^2$
T=7.6 ft.
Based on these parameters, the following table shows the turpentine overflow back pressure in view of the under flow resistance:

| Turpentine overflow back pressure ($P_d$) | Underflow Flow Resistance (Ps) | | |
|---|---|---|---|
| | 0 | 0.01 | 0.1 |
| | Calculated Turpentine Depth (ft) | | |
| −0.5 | −4.75 | −4.9 | −6.4 |
| −0.25 | −0.6 | −0.7 | 2 |
| 0 | 3.6 | 3.5 | 10.3 |
| 0.25 | 7.8 | 7.6 | 18.7 |
| .5 | 11.9 | 11.8 | 27 |

In most systems, the backpressure on the turpentine overflow is close to 0 as is the underflow (water) dynamic friction loss if the lines are sized correctly. In such cases the interface location can be simplified to:

$$T=X*D_w/(D_w-D_t) \quad (6)$$

In this case the depth of the turpentine bed increases by a factor of 7.3 inches for every inch of underflow level change. Therefore if the underflow level is adjustable, the minimum to maximum control span should be less than about three (3) inches (7.6 cm).

Most turpentine decanters have a depth of less than 10 feet. The normal depth of the turpentine bed is about 25% of the decanter depth. In the table above, if there is a small backpressure this can serve to force the turpentine to underflow the decanter. Similarly if there is a small vacuum on the decanter relative to the underflow standpipe the turpentine bed depth will be decreased. This can result in significant water carry-over into the storage tank. This has been noted to occur in installations that have recently been retrofitted to an NCG gas collection system. Backpressure from the NCG system will increase the depth of the water layer in the decanter. This could be expected if the condensate flow to the decanter has increased sharply as the result of a mill modernization.

Air Emissions and Permitting

If VOC emissions from the pellet plant exceed 250 tons per year, the facility would be classified as a major air emission source under the Clean Air Act. The United States Environmental Protection (EPA) requires that major air emission sources utilize Best Available Control Technology (BACT) to control emissions. If a facility installs emissions controls it can limit its potential to emit to less than 250 TPY, and avoid the time and expense required for New Source Review (NSR). The EPA has determined that the BACT for controlling emissions from wood pelletizing plants should consist of a wet electrostatic precipitator (ESP) and a regenerative thermal oxider (RTO), or equivalent technologies. In addition to their capital cost, the RTO must utilize natural gas or other fuels in order to combust the VOC's from the dryer exhaust, and the ESP produces waste water that must be disposed.

Pelletizing plants using southern yellow pine as feedstock with capacities of greater than approximately 150,000 to 160,000 tons per year would likely produce more than 250 tons of VOC's per year, depending on specific operating conditions. However, by employment of the disclosed embodiments of the turpentine recovery technique, most of the VOCs emitted from the dryer are captured and thus, the potential VOC emissions could potentially not exceed the 250 TPY major source threshold. Therefore, the employment of embodiments of the recovery system operate to obviate the need to install an ESP/RTO emission control system, or other similar controls, thereby reducing the capital and operating cost of the project.

Figure 5:
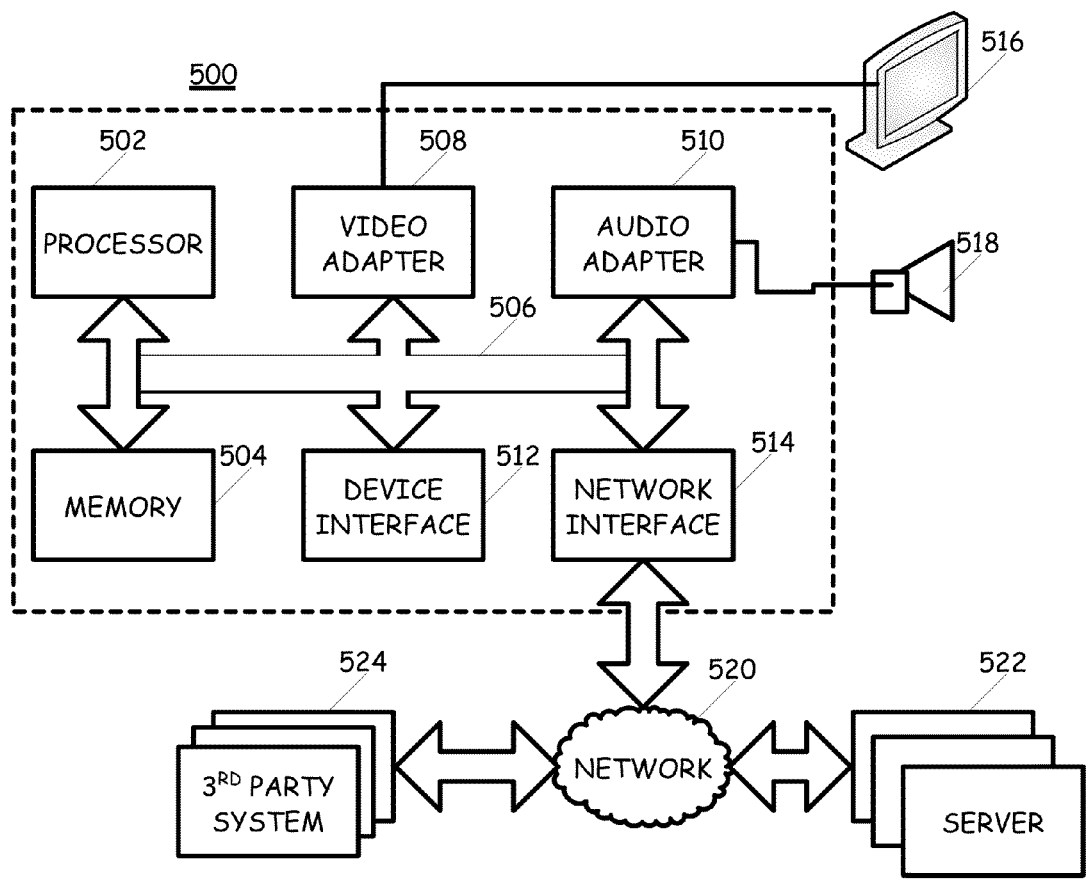
FIG. 5 is a functional block diagram of the components of an exemplary embodiment of a device that can exist in the various embodiments presented in this disclosure.

FIG. 5 is a functional block diagram of the components of an exemplary embodiment of a device that can exist in the various embodiments presented in this disclosure. For instance, the turpentine recovery system, the controller for controlling the temperature in the dryer, etc. can include a component or subsections of the system illustrated in FIG. 5. It will be appreciated that not all of the components illustrated in FIG. 5 are required in all embodiments of the individual components but, each of the components are presented and described in conjunction with FIG. 5 to provide a complete and overall understanding of the components. The device can include a general computing platform 500 illustrated as including a processor/memory device 502/504 that may be integrated with each other or, communicatively connected over a bus or similar interface 506. The processor 502 can be a variety of processor types including microprocessors, micro-controllers, programmable arrays, DSP, custom IC's etc. and may also include single or multiple processors with or without accelerators or the like. The memory element of 504 may include a variety of structures, including but not limited to RAM, ROM, magnetic media, optical media, bubble memory, FLASH memory, EPROM, EEPROM, etc., as well as a combination of two or more of each of these memory types. The processor 502, or other components may also provide components such as a real-time clock, analog to digital convertors, digital to analog convertors, etc. The processor 502 also interfaces to a variety of elements including a control or device interface 512, a display or video adapter 508, an audio adapter 510, and network/device interface 514. The device interface 512 provides an interface to external devices such as sensor, actuators, keyboards, data entry devices, or the like. The display adapter 508 can be used to drive a display device 516 including an LED display, LCD display, monitor, one or more LEDs or other display devices. The audio adapter 510 interfaces to and drives elements 518 such as a speaker or speaker system, buzzer, bell, etc. The network interface 514 can be used to interface the computing platform 500 to other devices through a network 520. The network may be a local network, a wide area network, wireless network, a global network such as the Internet, or any of a variety of other configurations including hybrids, etc. The network/interface 514 may be a wired interface or a wireless interface. The computing platform 500 is shown as interfacing to a server 522 and a third party system 524 through the network 520. It will also be appreciated that other similar devices may be included in the network cloud 520 and serve as an intermediary between the computing platform 500 and a server 522 and/or third party system 524.

Figure 6:
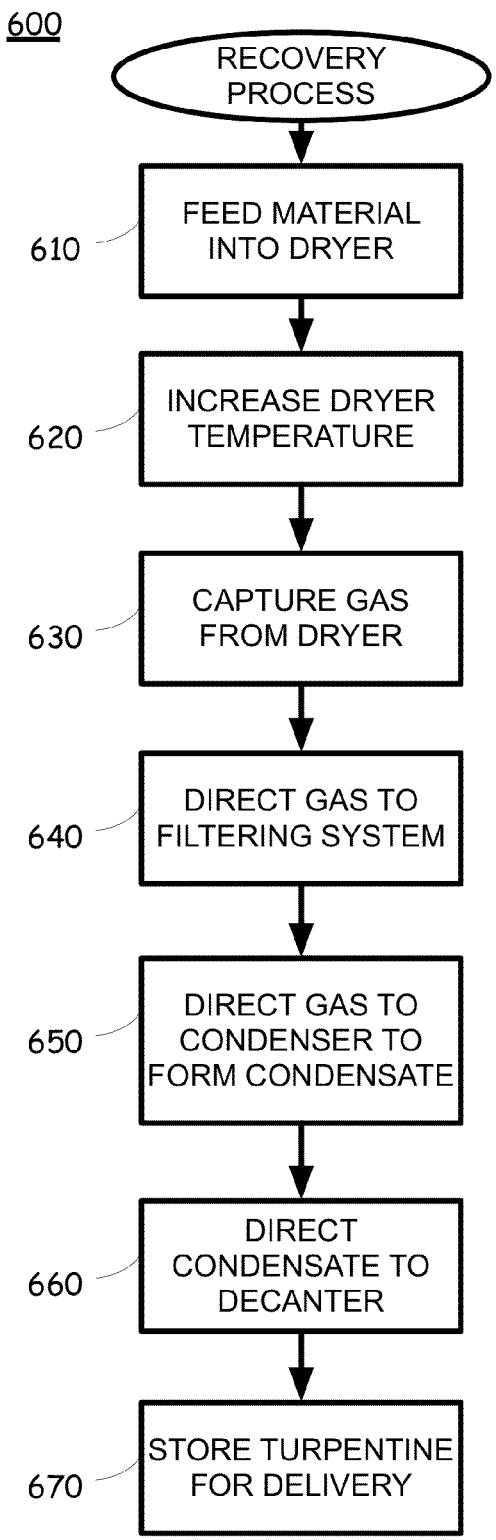
FIG. 6 is a flow diagram depicting the operation of an exemplary embodiment of a turpentine recovery system.

FIG. 6 is a flow diagram depicting the operation of an exemplary embodiment of a turpentine recovery system. Initially, the material being processed, such as wood chips, etc., is fed into a dryer 610. The dryer is then controlled to increase the temperature to a level that is sufficient to evaporate the turpentine present in the processed material 620. The gas generated in the dryer is then captured 630 and optionally directed to a filtering system 640. The gas is then directed into a condenser in which the gas is converted into a condensate 650. The condensate is then directed to a decanter 660 in which the turpentine is separated from the rest of the mater in the condensate. The turpentine can then be stored in a container or storage tank, or shipped directly for delivery 670. The action of increasing the dryer temperature may include initially heating the dryer to a temperature that is sufficient to evaporate turpentine but prevent an auto-ignite of the turpentine. As a non-limiting example, the temperature may be raised to a level below 428 degrees Fahrenheit. In other embodiments, the action of increasing the temperature of the dryer may be conducted in phases. For instance, in a first phase, the dryer temperature may be increased to a level that is sufficient to evaporate the turpentine from the material but prevent an auto-ignite of the turpentine for a first period of time. During a subsequent period of time, the temperature of the dryer may be raised to a level in the range of 600 to 800 degrees Fahrenheit for a second period of time to extract other liquids from the material. It should be appreciated that multiple dryers operating at different temperatures may also be used as a multi-stage process rather than a multi-phase process.

Figure 7:
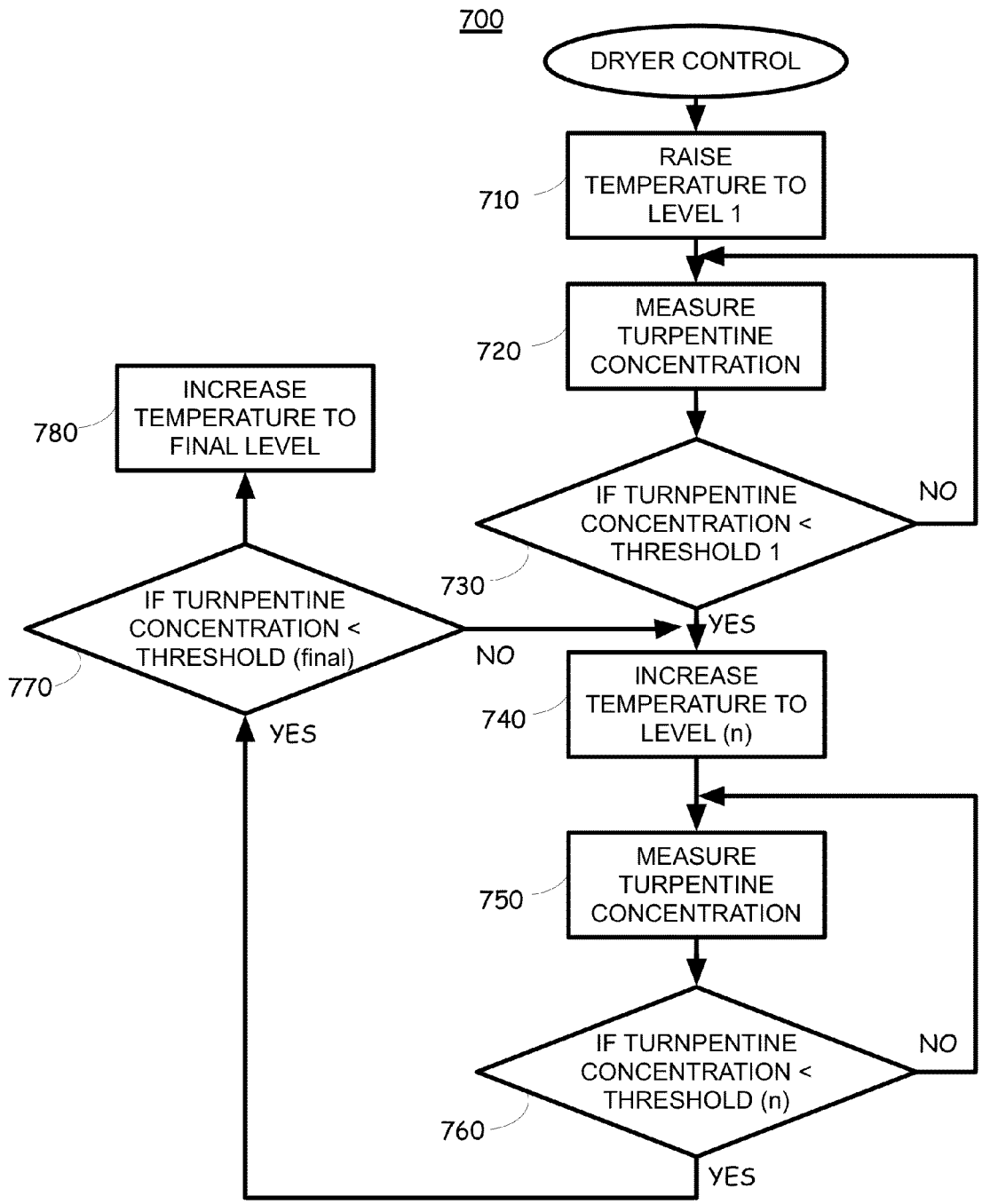
FIG. 7 is a flow diagram depicting exemplary actions that may occur in an exemplary process for controlling a dryer.

FIG. 7 is a flow diagram depicting exemplary actions that may occur in an exemplary process for controlling a dryer. Initially, the temperature in the dryer is raised to a level (LEVEL 1) sufficient to evaporate the turpentine from the processed material and create a gas 710. The gas is then fed into the recovery system and the percentage of turpentine extracted is measured 720 (turpentine concentration of gas is measured). If the concentration of the turpentine is not below a threshold level (i.e. THRESHOLD 1) 730, the process continues to extract and monitor the turpentine at the current temperature level (LEVEL 1) 720. However, if the concentration level of the turpentine is below the threshold level (THRESHOLD 1) 730, then the current temperature may not be sufficient to extract the desired amount of turpentine and thus, the temperature in the dryer can be increased to a next level (LEVEL (n)) 740. The process then continues to monitor the turpentine level and if the concentration remains above a next threshold level (THRESHOLD (n)) 760, then the concentration is still monitored 750. If, however, the concentration of turpentine drops below the next threshold level (THRESHOLD (n)), then the concentration of the gas is examined to determine if the concentration level is below a final threshold level (THRESHOLD (final)). If the concentration has not dropped below the final threshold level, processing may continue by increasing the temperature level to the next level 740 and continuing. If, however, the level of concentration drops below the final threshold level (THRESHOLD (final)) 770, then the temperature in the dryer can be raised to a final level to complete the extraction process 780. Thus, it should be appreciated that in the various embodiments, several levels can be defined for this process and as such, the loop between decision block 760 and 740 may be repeated for several temperature levels and threshold levels prior to entering the last stage of the process.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

In this application the words "unit", "element", "action", "process", "procedure" and "module" (collectively referred to as elements) are used interchangeably. Anything designated as a "unit", "element", "action", "process", "procedure" and "module" may be a stand-alone element or a specialized portion of another element. Further, each element may be modular or have modular aspects allowing it to be easily removed and replaced with another similar element. Each element may be any one of, or any combination of, software, hardware, and/or firmware. Software of a logical module can be embodied on a computer readable medium such as a read/write hard disc, CDROM, Flash memory, ROM, etc. In order to execute a certain task a software program can be loaded to an appropriate processor as needed.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Many other ramification and variations are possible within the teaching of the embodiments comprising different combinations of features noted in the described embodiments.

It will be appreciated by persons skilled in the art that the present invention is not limited by what has been particularly shown and described herein above. Rather the scope of the invention is defined by the claims that follow.

What is claimed is:

1. A system for extracting turpentine during the processing of wood chips, the system comprising:
a dryer for receiving wood chips and heating the wood pellets at a temperature that is below the auto ignite temperature of turpentine to generate a gas that includes a percentage of turpentine;
a filter for receiving the gas from the dryer and removing any particulates;
a condenser that receives the filtered gas and condenses the gas to a condensate; and
a decanter for receiving the condensate and separating the turpentine from other matter within the condensate.

2. The system of claim 1, wherein the filter is a cyclone separator.

3. The system of claim 1, wherein the filter is a wet electrostatic precipitator.

4. The system of claim 1, wherein the decanter comprises a first outlet for removing turpentine from the decanter and a second outlet for removing other materials.

5. The system of claim 1, further comprising a storage tank for receiving the turpentine from the first outlet of the decanter.

6. The system of claim 1, further comprising a treatment system that receives the other materials from the second outlet of the decanter.

7. The system of claim 1, further comprising a gas cooler that receives gas from the condenser that was not converted into condensate, and cools the gas to condense it prior to delivering the condensed gas to the decanter.

8. The system of claim 7, wherein the gas cooler further includes a vent for outputting VOC.

9. The system of claim 1, wherein the dryer includes at least two stages, and wherein the first stage of the dryer heats the wood chips to a temperature for extracting the turpentine and, the second stage heats the wood chips to a temperature for extracting other materials from the wood chips.

10. They system of claim 9, wherein the temperature and the exposure time of the wood chips in the at least two stages can be adjusted.

11. The system of claim 9, wherein the temperature in the first stage ranges from 300-400 degrees Fahrenheit.

12. The system of claim 11, wherein the temperature in the second stage ranges from 600 to 800 degrees Fahrenheit.

13. The system of claim 9, wherein the temperature in the first stage is less than the auto-ignite temperature of turpentine.

14. The system of claim 13, wherein the temperature in the first stage is less than 428 degrees Fahrenheit.

15. The system of claim 1, wherein the dryer is operated in at least two phases, and wherein during the first phase, the temperature of the dryer remains below the auto-ignite temperature of turpentine and during a second phase, the temperature of the dryer exceeds the auto-ignite temperature of turpentine.

16. A method for the recovery of turpentine from a wood processing system, the method comprises the actions of:
feeding wood being processed by the wood processing system into a dryer;
heating the dryer to a temperature sufficient to evaporate the turpentine present in the wood being processed but is below the auto ignite temperature of turpentine, thereby creating a gas;
directing the gas containing at least the evaporated turpentine from the dryer into a condenser to create a condensate;
fluidly directing the condensate into a decanter; and
the decanter separating the turpentine from other materials in the condensate.

17. The method of claim 16, wherein the action of heating the dryer to a temperature sufficient to evaporate the turpentine comprises initially heating the dryer to a temperature that is sufficient to evaporate turpentine but prevent an auto-ignite of the turpentine.

18. The method of 16, wherein the action wherein the action of heating the dryer to a temperature sufficient to evaporate the turpentine comprises initially heating the dryer to a temperature that is sufficient to evaporate turpentine but prevent an auto-ignite of the turpentine for a first period of time, and then heating the dryer to a temperature in the range of 600 to 800 degrees Fahrenheit for a second period of time.

19. The method of claim 16, wherein the action wherein the action of heating the dryer to a temperature of about 428 degrees Fahrenheit or less to evaporate the turpentine comprises initially heating the dryer to a temperature that is sufficient to evaporate turpentine but prevent an auto-ignite of the turpentine for a first period of time, and then heating the dryer to a temperature in the range of 600 to 800 degrees Fahrenheit for a second period of time.

20. A method for modifying a wood processing system to aid in the recovery of turpentine, the method comprises the actions of:
controlling the temperature of a dryer used to dry the wood being processed such that the temperature is increased to a level sufficient to evaporate the turpentine present in the wood being processed to create a gas but, the temperature is maintained below the auto ignite temperature of turpentine and, operating the dryer for a period of time to ensure the moisture content of the wood being processed is reduced from approximately 45% to 55% down to approximately 8% to 12%;
directing the gas containing at least the evaporated turpentine from the dryer into a condenser to create a condensate;
fluidly directing the condensate into a decanter; and
the decanter separating the turpentine from other materials in the condensate.

* * * * *